(12) United States Patent
Fujioka

(10) Patent No.: US 9,953,219 B2
(45) Date of Patent: Apr. 24, 2018

(54) APPARATUS FOR RECOGNIZING HANDWRITTEN NOTES

(71) Applicant: Mattel, Inc., El Segundo, CA (US)

(72) Inventor: Robb Fujioka, Manhattan Beach, CA (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 14/621,223

(22) Filed: Feb. 12, 2015

(65) Prior Publication Data

US 2015/0227786 A1    Aug. 13, 2015

Related U.S. Application Data

(60) Provisional application No. 61/938,813, filed on Feb. 12, 2014.

(51) Int. Cl.
*G06K 9/00* (2006.01)
*G06F 3/0354* (2013.01)
*G06F 3/03* (2006.01)

(52) U.S. Cl.
CPC ....... *G06K 9/00442* (2013.01); *G06F 3/0317* (2013.01); *G06F 3/03542* (2013.01); *G06F 3/03545* (2013.01); *G06K 9/00409* (2013.01)

(58) Field of Classification Search
None
See application file for complete search history.

(56) References Cited

U.S. PATENT DOCUMENTS

| | | | |
|---|---|---|---|
| 5,215,397 A | 6/1993 | Taguchi et al. | |
| 6,181,329 B1 | 1/2001 | Stork et al. | |
| 7,102,625 B2 | 9/2006 | Woods et al. | |
| 8,300,252 B2 | 10/2012 | Marggraff | |
| 2005/0156915 A1* | 7/2005 | Fisher | G06F 3/0317 345/179 |
| 2006/0031245 A1 | 2/2006 | Krieglstein | |
| 2013/0082937 A1 | 4/2013 | Liu et al. | |

OTHER PUBLICATIONS

International Search Report dated May 27, 2015 in corresponding PCT Application No. PCT/US2015/15703 filed Feb. 12, 2015, inventor Fujioka, Robb.

* cited by examiner

*Primary Examiner* — Mark Roz
(74) *Attorney, Agent, or Firm* — Kolisch Hartwell, P.C.

(57) ABSTRACT

An apparatus converts written marks on a writing surface into a digital form. According to one embodiment, the apparatus includes a writing portion configured to create a physical mark on a surface and a recording portion configured to capture the physical mark. The apparatus further includes a processor configured to process the physical mark and generate a digital mark from the physical mark, a memory for storing the digital mark, and a transmitter to transmit a digital image of the captured mark to an external device.

13 Claims, 4 Drawing Sheets

APPARATUS FOR RECOGNIZING HANDWRITTEN NOTES

CROSS REFERENCES

This application claims the benefit of and priority to U.S. Provisional Application No. 61/938,813, filed on Feb. 12, 2014, entitled "Optical Recognition of a Writing Implement," the disclosure of which is hereby incorporated by reference in its entirety.

FIELD

The field of the present disclosure generally relates to writing implements with an optical recognition capability, more particularly, to an apparatus for recognizing handwritten notes, and converting, storing, and displaying the hand-written notes to a digital form.

BACKGROUND

Conventional writing instruments such as pens, pencils, and crayons are used to write notes on papers. Storing and organizing papers with handwritten notes become time and space consuming. One option to store and retrieve information from a handwritten note is to scan the handwritten note, and convert it into a digital form. To convert a handwritten note into a digital form, individual pages of the handwritten note are digitally scanned and stored on a digital storage medium. However, digital scanning and conversion of a handwritten note still requires separating, scanning, and storing pages for a later search and retrieval of desired pages.

SUMMARY

An apparatus converts written marks on a writing surface into a digital form. According to one embodiment, the apparatus includes a writing portion configured to create a physical mark on a surface and a recording portion configured to capture the physical mark. The apparatus further includes a processor configured to process the physical mark and generate a digital mark from the physical mark, a memory for storing the digital mark, and a transmitter to transmit a digital image of the captured mark to an external device.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The drawings refer to embodiments of the present disclosure in which.

Figure 1:
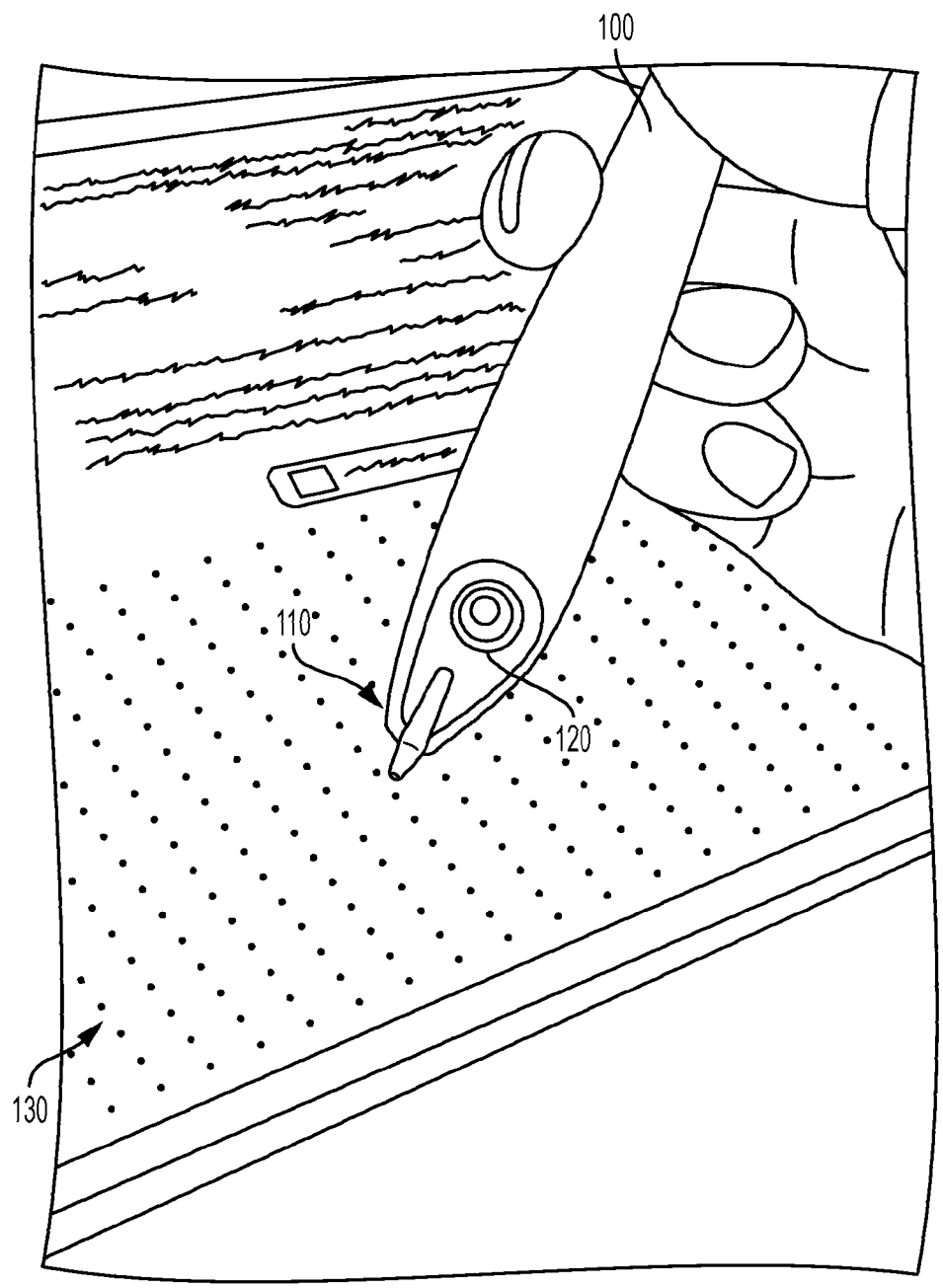
FIG. 1 illustrates an exemplary writing implement, according to one embodiment.

While the present disclosure is subject to various modifications and alternative forms, specific embodiments thereof have been shown by way of example in the drawings and will herein be described in detail. The present disclosure should not be understood to limit to the particular forms disclosed, but on the contrary, the intention is to cover all modifications, equivalents, and alternatives falling within the spirit and scope of the present disclosure.

DETAILED DESCRIPTION

An apparatus converts written marks on a writing surface into a digital form. According to one embodiment, the apparatus includes a writing portion configured to create a physical mark on a surface and a recording portion configured to capture the physical mark. The apparatus further includes a processor configured to process the physical mark and generate a digital mark from the physical mark, a memory for storing the digital mark, and a transmitter to transmit a digital image of the captured mark to an external device.

In the following description, numerous specific details are set forth in order to provide a thorough understanding of the present disclosure. It will be apparent, however, to one of ordinary skill in the art that the present disclosure may be practiced without these specific details. Thus, the specific details set forth are merely exemplary. The specific details may be varied from and be contemplated to be within the spirit and scope of the present disclosure.

Although some embodiments of the present disclosure are described and illustrated in terms of pens, it should be understood that embodiments of the present disclosure are not so limited. Instead, the embodiments of the present disclosure are applicable to any writing instruments including, but not limited to, a ballpoint pen, a felt pen, an ink pen, a pencil, a crayon, a marker, a paint brush, and a paint pen. Furthermore, although embodiments of the present disclosure may be described and illustrated herein in terms of workbooks, it should be understood that embodiments of the present disclosure are also applicable to other templates and written forms, such as coloring books, art templates, tests, forms, and any combinations thereof.

The present disclosure describes a writing implement (herein exchangeably referred to as a writing system, a system, a writing device, or a device). The writing implement is used to create a written mark on a writing surface, such as a paper. The writing implement also optically recognizes and converts analog written marks into a digital form for storage, and/or retrieval of information. The writing implement includes one or more sensors and/or an imaging device to detect the written mark on the writing surface. The writing implement converts the written mark into a digital representation of the written mark. The digital mark may be displayed on a screen in a form that is substantially identical to the physical written mark. The term "substantially identical" means in the substantially same form and/or proportion but is not necessarily the same dimension and size. Therefore, it is noted that the physical written form and the digital form of the mark are intended to represent the same mark.

Examples of the writing portion include, but are not limited to, a ballpoint pen, a felt pen, an ink pen, a pencil, a crayon, a marker, a highlight, a paint brush, and a paint pen. The recording portion is configured to optically recognize, detect, and/or sense a written mark on a writing surface (e.g., a paper, a display of a tablet computer) and convert the written mark into a digital form. The converted digital form is stored in a non-transitory machine-readable medium (e.g., on a local memory) of the writing implement. The digital recognition and conversion software may be stored within the local memory of the writing implement to be executed by a processor of the writing implement. The stored digital form may be transferred through hardware, or wirelessly to another digital medium of an external device (e.g., a tablet computer, a server) for display, storage, manipulation, editing, and recognition. The recording portion may not record data for a substantial time. Instead, the recording portion senses, detects, or analyzes a transitory version of a written mark. The recording portion may be used to capture and record written marks and symbols that are written with another writing instrument, including a pen, a pencil, and a crayon.

FIG. 1 illustrates an exemplary writing implement, according to one embodiment. The writing implement 100 includes a writing portion 110 for writing marks (e.g., images, characters) on a writing surface (e.g., a paper) and a recording portion 120 (e.g., camera) for optically detecting and converting the written marks into a digital form. In one embodiment, the writing portion 110 is a ballpoint pen. The recording portion 120 includes a camera at a first end portion of the writing implement 100 that is configured to detect marks written on a writing surface by the writing portion 110 and converts the written marks into a digital form (e.g., an image file). In one embodiment, the writing implement includes a processor that analyzes the marks detected by the recording portion 120 and converts the written marks into a digital form. In another embodiment, an image file scanned by the recording portion 120 is sent to an external device (e.g., a tablet computer) using a wireless transmitter of the writing implement 100 for image processing to convert the written marks to a different digital form such as characters, text, and symbols.

According to one embodiment, the writing implement 100 captures and stores written marks in real-time. The digital form may be a track of one mark compared to a previous mark. For example, the letter "i" is tracked as sequentially connecting marks including a vertical line and a dot separated with a space. The writing implement may analyze and convert the written marks and store characters instead of images. For example, the written mark "i" is converted from an image including a line and a dot to a character "i" to a character "i".

The recording portion 120 of the written implement 100 may detect and record analog images written by the writing portion 110 and convert to a digital form in a variety of ways. In one embodiment, the writing surface has a pattern that provides a unique coordinate position to written marks when recorded by the recording portion. According to one embodiment, the writing surface is a sheet of paper printed with a dot matrix 130. The pre-printed dot matrix 130 provides a unique coordinate location when the recording portion records any portion of the writing surface. The dots may form a pre-printed pattern to trace along, for example, an alphabet letter or a circle around an image of an object. In one embodiment, a tutorial workbook includes an alphabet letter enclosed in a dotted circle, a picture associated with the letter, and a dotted trace of the letter. Using the writing implement, a child taps the picture to hear the name of the picture, and draws a circle along the dotted circle around the alphabet letter to hear the beginning sound of the alphabet letter. The child also uses the writing implement to trace over the dotted trace of the letter. In another embodiment, a tutorial workbook includes an alphabet letter and pictures that have the same beginning sound as the alphabet letter. Each picture is enclosed in a dotted circle. Using the writing implement, a child taps each picture and traces over the dotted circle of the picture to hear the sound. When a mark appears on the writing surface, the mark is associated with the unique coordinate location on the dot matrix 130. The mark may be provided with a reference to another mark that is previously captured, enabling the recording of the entire written image on the page. The same dot matrix may be used for each page in the workbook or a different dot matrix may be used on one or more pages.

According to one embodiment, the writing surface provides context to the detected written marks. For example, the writing surface may be pre-printed, such as for a workbook, coloring book, lined paper, etc. The writing implement 100 may be programmed to recognize the writing surface and detect one or more attributes of the pre-printed page that provides a specific location context for the written marks provided by the writing implement 100. The context may be provided in a color, an image thickness, a line style, a font, etc.

According to one embodiment, the writing portion 110 of the writing implement 100 is configured to be used with little or no interference from the recording portion 120. For example, the writing implement 100 is a pen having a longitudinal body that is configured to be held with fingers of a user. The writing portion 110 projects from one end to another end of the longitudinal body. The longitudinal body houses the recording portion 120 (e.g., a camera) at one end of the writing implement 100 that marks in the direction of the writing projection. The recording portion 120 is positioned at or adjacent to a finger-gripping portion to provide a balance when writing on a writing surface.

Figure 2:
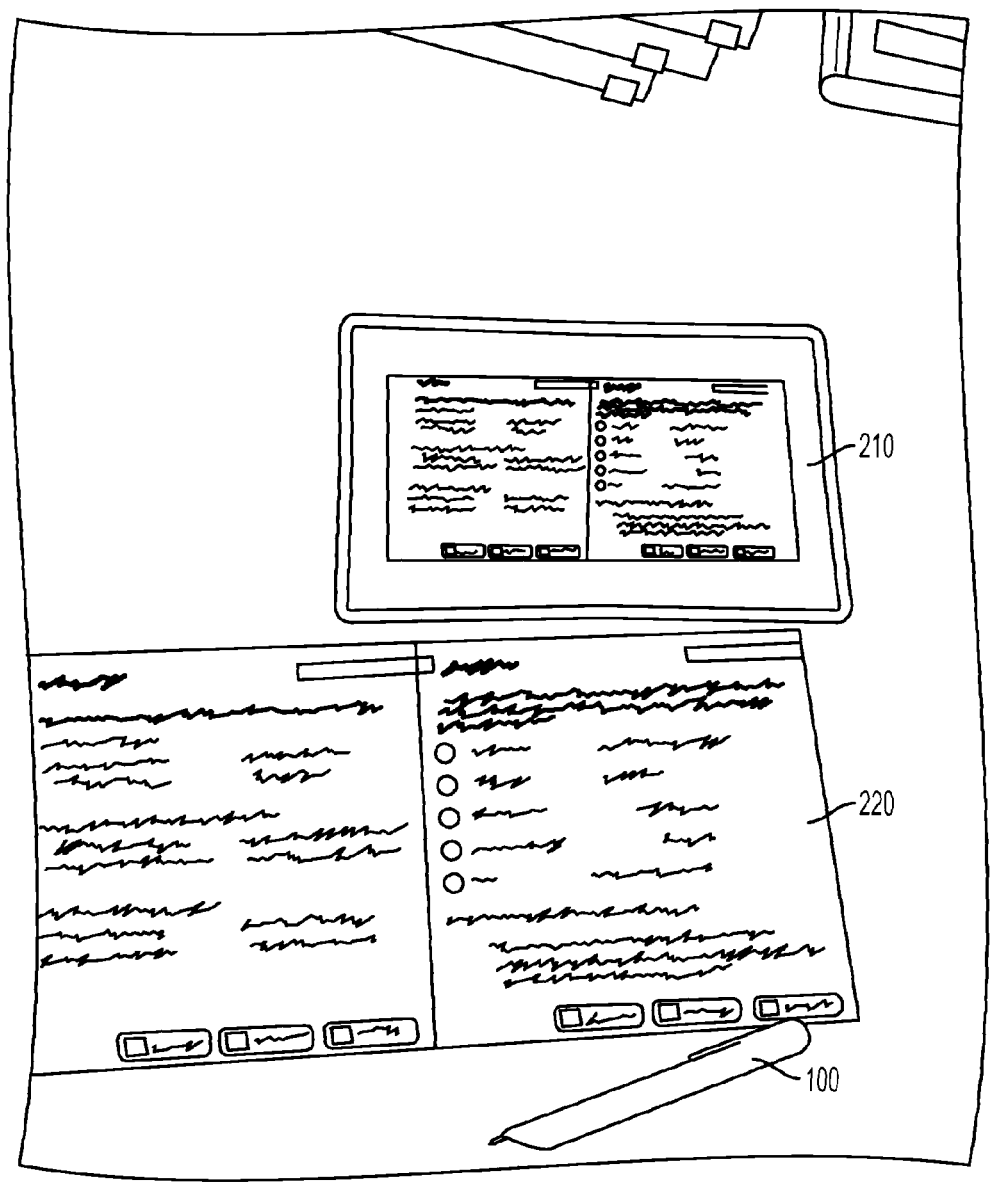
FIG. 2 illustrates an exemplary use of the writing implement with a digital workbook, according to one embodiment.

FIG. 2 illustrates an exemplary use of the writing implement with a digital workbook, according to one embodiment. The writing implement 100 is used in conjunction with a digital medium 210 that provides a digital workbook. The digital workbook includes one or more pages and/or one or more activities. A user uses the writing portion of the writing implement 100 to fill in, answer, or complete the activities by writing on the physical workbook 220.

The digital medium 210 may be a laptop, a tablet computer, a smart phone, a computer, or any other electronic device. The digital medium 210 has a display that display marks that are written by the writing portion of the writing implement 100 on the physical workbook 220 and detected by the recording portion of the writing implement 100. The digital medium 210 further includes a processor, memory, and input/output ports for connecting external devices. The memory stores non-transitory machine-readable medium that is executed by the processor to execute instructions and perform functions according to the instructions. For example, the digital medium 210 includes software that displays marks that correspond to the physical marks written the physical workbook 220. Therefore, the activities and marks of the digital workbook may be reproduced in a digital form and presented on the display of the digital medium 210.

Using the writing implement 100, the user leaves one or more physical marks on the physical workbook 220. The recording portion of the writing implement 100 identifies the physical marks relative to one or more sensors, other marks, or the writing surface, and displays a digital reproduction of the physical marks on the digital medium 210. The digital reproduction of the physical marks may be stored, saved, sent to another device, or otherwise manipulated by a user.

According to some embodiments, the writing implement 100 in conjunction with the digital medium 210 is used in academia settings. For example, the writing implement 100 is used to facilitate homework assignments, self-testing, self-education, and self-improvement. The writing implement 100 may record the written analog information in a digital form, save and organize it, and/or permit the user to send it by email, messages, text, or other means to a remote location or a remote system.

According to one embodiment, the writing implement 100 is used to digitally recognize a recorded text on a writing surface (e.g., the physical workbook 220) and analyze the digitized data relative to a location on the writing surface. For example, a matching digital activity that corresponds to an activity shown on the physical workbook 220 is displayed on the display of the digital medium 210. The writing implement 100 recognizes a user's response to the activity and assesses the validity of the response. For example, if a user is working on an arithmetic workbook, the digital workbook may have a series of math problems. The digital medium 210 may have a program illustrating a representation of the same series of math problems. When a user writes answers with written marks in a designated location on the physical workbook 220, the recording portion of the writing implement 100 digitally records and processes the written marks. The writing implement 100 processes the written marks or forwards the recorded digital form to the digital medium 210 or an external digital device for further processing.

According to one embodiment, the writing implement 100 recognizes answers provided by the user as one or more numbers or characters. In another embodiment, the digital medium 210 receives the digital form from the writing implement 100 and recognizes the answer. In yet another embodiment, the writing implement 100 sends the digital form to an external computing device for data processing. Whether it is the writing implement 100, the digital medium 210, or the external computing device, or a combination thereof that recognizes and processes the user's answer, the present system recognizes and processes the user's answer. The present system further compares the user's answer with the correct answer that is pre-programmed into the system and associated with a respective line item on the digital workbook.

According to one embodiment, the present system is programmed to provide feedback to a user, keep a tallied score, provide comparison or assessments based on previous attempts at the same or different activities, report, record, save, or send the information to one or more user entered or pre-programmed locations. The feedback may be through the electronic media such as an email, a text message, or a posting on a social networking site. Via the electronic media, the user may get an indication that his/her answer was correct, what the correct answer is, and provide a video, audio, or other response when receiving either a correct or incorrect answer. The system may prompt the user to select a lesson based on an incorrect answer explaining how a desired result could have been obtained and/or how to provide the correct answer to the system.

In the example of an algebraic workbook, the present system may detect the entered number and determine whether the entered number is a correct answer. The present system indicates to the user if the answer is correct. For example, the answers may be marked with a green check mark augmented with additional graphical, animation, and/ or audible effects. Similarly, incorrect answers may be marked with a red check mark or graphically overwritten with a red "x".

The digital media may permit the user to obtain further information regarding any one of the entered answers. For example, the user may then select an answer indicated with an "x" to view a lesson or the correct answer. The digital media may present a further lesson on a specific question, such as addition or subtraction. The digital media may present a remedial lesson, such as indicating counting figures or an alternative learning style to present the information in a different form (e.g., audio, visual-graphical). The lesson may be reinforced in a manner such that the user can comprehend and retain.

Several embodiments of the present disclosure are shown and described herein. The disclosed embodiments are exemplary only and may be used in any combined, recombined, sub combination, etc. Therefore, features and components may be duplicated, subtracted, or combined in any configuration and remain within the scope of the present disclosure.

Figure 3:
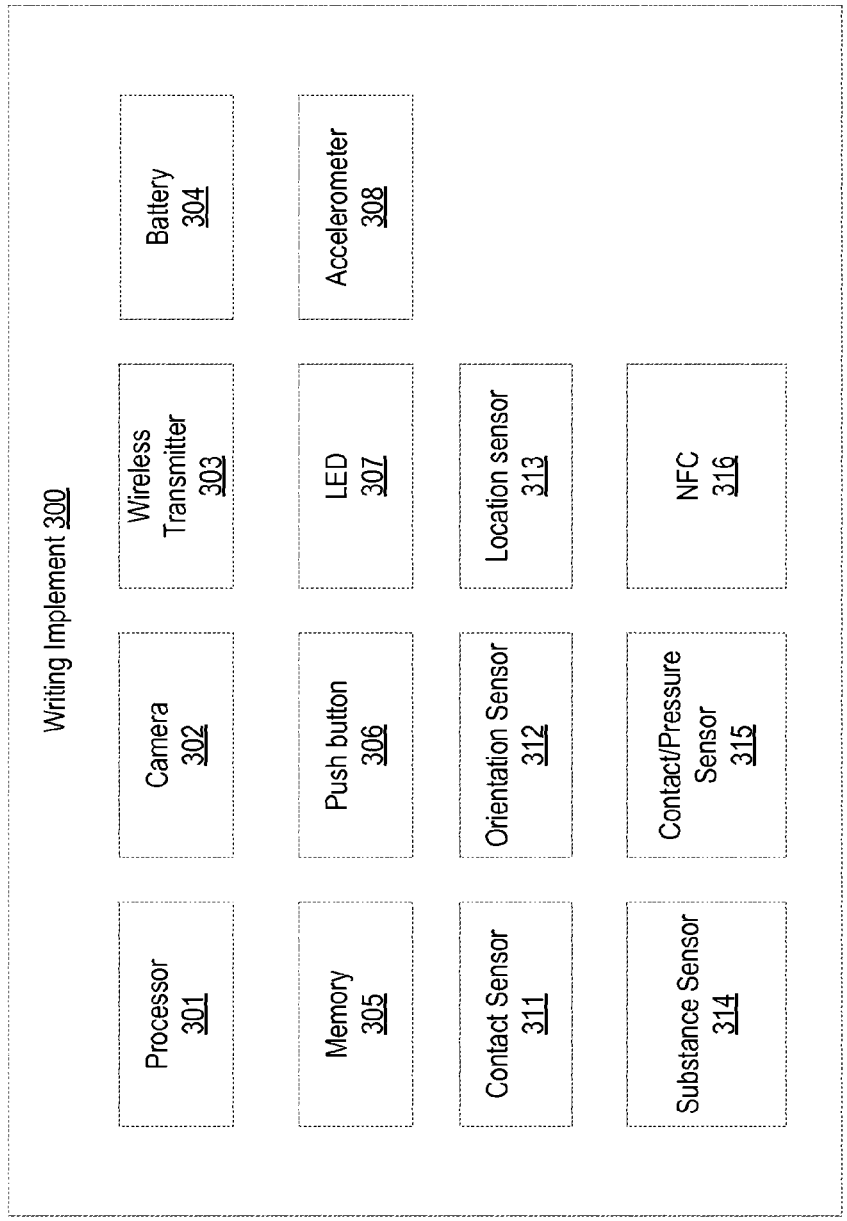
FIG. 3 illustrates a schematic diagram of an exemplary writing implement, according to one embodiment.

FIG. 3 illustrates a schematic diagram of an exemplary writing implement, according to one embodiment. The writing implement 300 includes a processor 301, a camera 302, a wireless transmitter 303, a battery 304, and a memory 305. The processor 301 is configured to detect, process, and convert physical marks written on a writing surface and generate digital marks from the physical marks. The digital marks are stored in the memory 305 temporarily, and sent to an external device (e.g., a tablet computer) via the transmitter 303. The received signal may be indicated on an LED 307. The processor 301 analyzes the marks detected by the camera 302 and converts the written marks into a digital form. In one embodiment, the image file captured by the camera 302 is sent to an external device (e.g., a tablet computer, a server) via the transmitter 303 for image processing to convert the written marks to a different digital form.

According to one embodiment, a user may indicate using the writing implement 300 that a new page is started by imaging a symbol on the writing surface using the camera 302 or pushing a button 306 of the writing implement. In another embodiment, the user may shake the writing implement 300 that provides a motion-based input. The motion input is detected by an accelerometer 308 to generate a signal to the processor 301. The user may provide a different input to distinguish a first page location from a second page location using the push button 306 and the accelerometer 308.

According to one embodiment, the writing implement 300 is configured to receive a user input for a book indicator. The book indicator is configured to automatically record, group, save, categorize, or organize the recorded marks. For example, a user may keep different journals for school. The book indicator identifies a subject associated with the written marks by interpreting a user input. Colors, images, paper background patterns, buttons, wireless signals, or other inputs may be used to indicate a subject associated with the written marks. The written marks detected and recognized by the writing implement 300 are sent to an external device to store the subject along with the marks and the book indicator, and automatically organizes and categorizes the recorded digital marks for the user based on the subject.

The writing implement 300 includes various sensors 311-316 to record the analog marks and detect user inputs, and determine the location and orientation of the writing implement 300. For example, the writing implement 300 is equipped with a sensor that detects or recognizes an ink or a deposited material by the writing implement 300. In another example, the sensors are configured to detect or recognize the orientation of the marks with respect to other sensors, markings, location features of the writing surface.

According to one embodiment, the writing implement 300 includes a substance sensor 314 to detect deposited substance (e.g., an ink) written by the writing implement 300 on a writing surface. For example, the ink may include magnetic or electromagnetic substance that can be detected by the substance sensor 314. The substance sensor 314 may detect the present marking deposition relative to a previous marking deposition. The writing implement 300 may shield the contained ink within the writing implement 300 from the substance sensor 314 such that the substance sensor 314 detects only the deposited ink on the writing surface.

According to one embodiment, the writing implement 300 includes a location sensor 313 that determines the orientation of the writing implement 300 relative to the writing surface. The writing surface may have one or more transmitters/receivers that are integrated or separate and oriented relative to the writing surface such that the writing implement 300 can determine its orientation and location within a frame relative to the writing surface. In one embodiment, the writing surface integrates a field generation tag. The field generation tag may be passive or actively incorporated into, onto, or near the writing surface. For example, the field generation tag is a near field communication (NFC) tag that is positioned on or incorporated into a page. The presence and location of an NFC tag is detected by an NFC reader 316 incorporated in the writing implement 300. Therefore, when the NFC tag brought into the proximity with the NFC reader 316, the writing implement 300 determines its orientation and location relative to the writing surface. One or more NFC tags and readers may uniquely or identify an orientation and a location on the writing surface. The NFC tags may be detected within a field across the writing surface that uniquely identifies each location across the surface. By detecting the field at a specific location, the writing implement 300 determine its coordinate position relative to the writing surface.

According to one embodiment, the writing implement 300 approximates its position, for example by triangulation, relative to the one or more sensors. Examples of such sensors include, but are not limited to, magnetic, electric, and electromagnetic sensor. Those sensors may be used in conjunction with one or more NFC tags and NFC readers.

According to one embodiment, one or more sensors are incorporated into the writing surface. Examples of such sensors include, but are not limited to, a dot matrix, a pre-printed text, symbols, or indicia on the writing surface. In one embodiment, the writing surface includes electromagnetic sensors that generate, alter, or create a field detectable by the writing implement 300 to determine the location and orientation relative to the surface.

According to some embodiments, the writing implement 300 continually monitors its location and orientation relative to the writing surface or selectively records its location using the orientation sensor 312 and/or the location sensor 313. The LED 307 indicates the status of the writing implement 300. When the writing implement 300 comes into contact with a writing surface, the writing implement 300 records its location and orientation relative to the writing surface. When the writing implement 300 is removed from the writing surface, the writing implement 300 stops recording its location and orientation.

According to one embodiment, the writing implement 300 further includes a contact sensor or a pressure sensor 315 to detect when a contact is made with the writing surface and start recording written marks. According to another embodiment, the writing implement 300 receives a user input from the push button 306 to start recording written marks. In one embodiment, the writing implement 300 starts recording its location and orientation in a writing implement mode when the writing implement 300 is in contact with the writing surface. In another embodiment, the writing implement 300 records its location and orientation in a command mode regardless of contact with the writing surface. In the command mode, the user may enter a configuration command to the writing implement 300, such as selecting a color, selecting digital recognition of a text, selecting a category or page number, etc. A selected or a predetermined motion of the writing implement 300 is correlated to a preprogrammed configuration parameter or program the writing implement 300 according to the preprogrammed configuration parameter.

Figure 4:
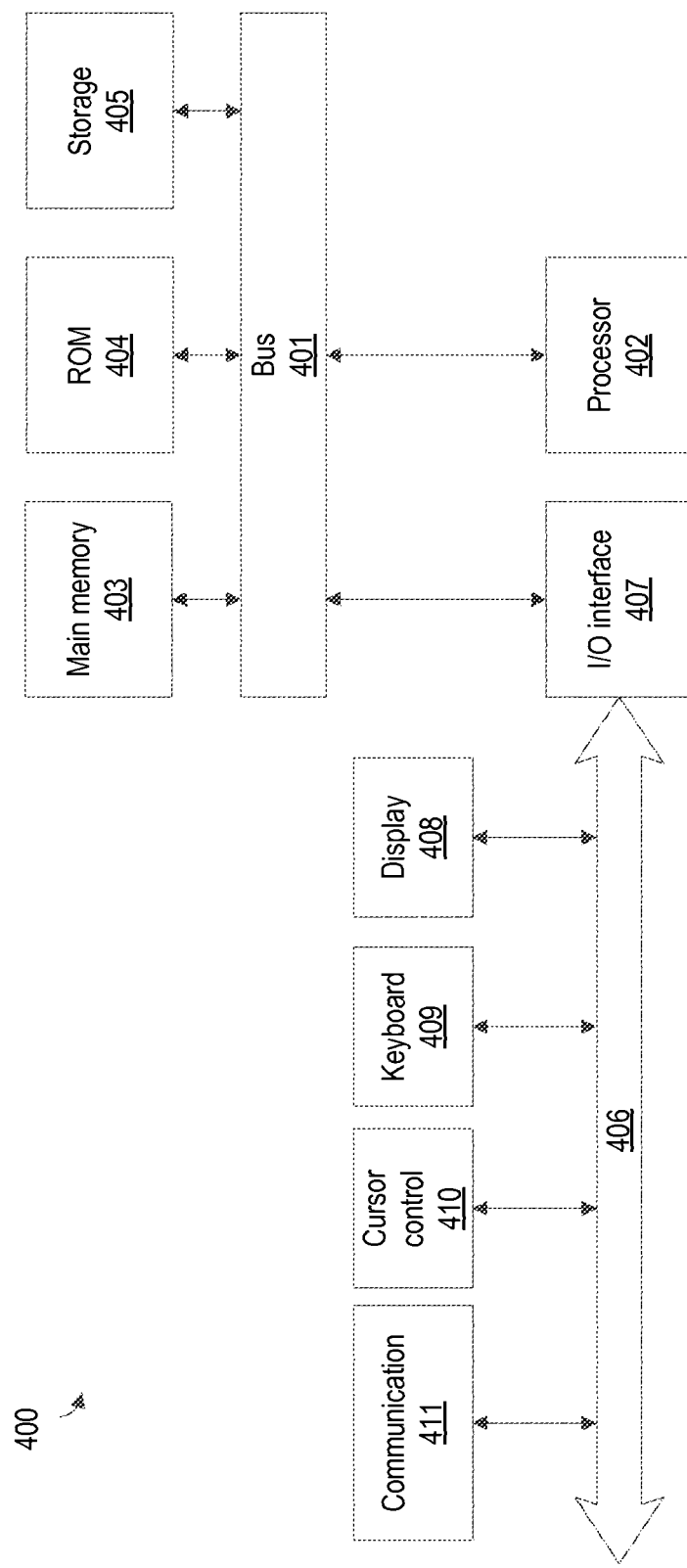
FIG. 4 illustrates an exemplary computer architecture that may be used for the present system, according to one embodiment.

FIG. 4 illustrates an exemplary computer architecture that may be used for the present system, according to one embodiment. The exemplary computer architecture may be used for implementing one or more components described in the present disclosure including, but not limited to, the present writing implement. One embodiment of architecture 400 includes a system bus 401 for communicating information, and a processor 402 coupled to bus 401 for processing information. Architecture 400 further includes a random access memory (RAM) or other dynamic storage device 403 (referred to herein as main memory), coupled to bus 401 for storing information and instructions to be executed by processor 402. Main memory 403 also may be used for storing temporary variables or other intermediate information during execution of instructions by processor 402. Architecture 400 may also include a read only memory (ROM) and/or other static storage device 404 coupled to bus 401 for storing static information and instructions used by processor 402.

A data storage device 405 such as a magnetic disk or optical disc and its corresponding drive may also be coupled to architecture 400 for storing information and instructions. Architecture 400 can also be coupled to a second I/O bus 406 via an I/O interface 407. A plurality of I/O devices may be coupled to I/O bus 406, including a display device 408, an input device (e.g., an alphanumeric input device 409 and/or a cursor control device 410).

The communication device 411 allows for access to other computers (e.g., servers or clients) via a network. The communication device 411 may include one or more modems, network interface cards, wireless network interfaces or other interface devices, such as those used for coupling to Ethernet, token ring, or other types of networks.

While some specific embodiments of the present disclosure have been shown, the present disclosure should not be interpreted to limit the scope of the present disclosure to these embodiments. For example, most functions performed by electronic hardware components may be duplicated by software emulation. Thus, a software program written to accomplish those same functions may emulate the functionality of the hardware components in input-output circuitry. The present disclosure is to be understood as not limited by the specific embodiments described herein, but only by scope of the appended claims.

Embodiments as described herein have significant advantages over previously developed implementations. As will be apparent to one of ordinary skill in the art, other similar apparatus arrangements are possible within the general scope. The embodiments described above are intended to be exemplary rather than limiting, and the bounds should be determined from the claims.

I claim:

1. A writing implement comprising:
   a writing portion configured to create a physical mark on a surface;
   a recording portion configured to capture the physical mark;
   a processor configured to process the physical mark and generate a digital mark from the physical mark;
   a memory for storing the digital mark; and
   a transmitter to transmit a digital image of the captured mark to an external device, wherein the writing implement receives a user input to identify a new page on the surface,
   the writing implement further comprising a substance sensor configured to detect and recognize a material deposited on the surface using the writing portion.

2. The writing implement of claim 1, wherein the recording portion tracks sequential marks and identifying a character indicated with the sequential marks.

3. The writing implement of claim 1, wherein the surface has a pre-printed dot matrix, wherein the processor identifies a coordinate location of the physical mark on the surface by referring to the coordinate location identified by the pre-printed dot matrix.

4. The writing implement of claim 1, the writing implement further comprises a push button, wherein the user input is imaging a symbol using the recording portion or by pushing the push button of the writing implement.

5. The writing implement of claim 1, wherein the user input indicates a book indicator specific to the surface, and wherein the digital mark is grouped, saved, categorized, or organized based on the book indicator.

6. The writing implement of claim 1, wherein the surface is a workbook, a coloring book, or a lined paper.

7. The writing implement of claim 1, wherein the material is selected from a magnetic material and an electromagnetic material.

8. The writing implement of claim 1, further comprising a location sensor configured to determine a location and an orientation of the writing implement.

9. The writing implement of claim 1, wherein the recording portion is a camera.

10. The writing implement of claim 1, further comprising a sensor configured to indicate to start recording a location and an orientation of the writing implement.

11. The writing implement of claim 10, wherein the sensor is selected from a pressure sensor, a contact sensor, and a proximity sensor.

12. The writing implement of claim 1, wherein the external device is a tablet computer configured to provide a workbook.

13. The writing implement of claim 12, wherein the tablet computer has a display that is configured to display the physical mark on the workbook.

* * * * *